US012348258B2

(12) United States Patent
Cartwright

(10) Patent No.: US 12,348,258 B2
(45) Date of Patent: Jul. 1, 2025

(54) PHONE CASE ASSEMBLY

(71) Applicant: Kevin Cartwright, Fairlawn, OH (US)

(72) Inventor: Kevin Cartwright, Fairlawn, OH (US)

( * ) Notice: Subject to any disclaimer, the term of this patent is extended or adjusted under 35 U.S.C. 154(b) by 426 days.

(21) Appl. No.: 17/946,114

(22) Filed: Sep. 16, 2022

(65) Prior Publication Data

US 2024/0097730 A1    Mar. 21, 2024

(51) Int. Cl.
*A45F 5/00* (2006.01)
*H04B 1/3888* (2015.01)
*H04M 1/06* (2006.01)

(52) U.S. Cl.
CPC ............. *H04B 1/3888* (2013.01); *A45F 5/00* (2013.01); *H04M 1/06* (2013.01); *A45F 2005/006* (2013.01); *A45F 5/1516* (2025.01)

(58) Field of Classification Search
CPC ........ A45F 2200/0516; A45F 2005/006; A45F 2200/0508; Y10S 24/93
See application file for complete search history.

(56) References Cited

U.S. PATENT DOCUMENTS

| | | | |
|---|---|---|---|
| 5,938,127 A | 8/1999 | Poulson | |
| 7,665,684 B2 | 2/2010 | Salentine | |
| 7,762,215 B2 | 7/2010 | Horton | |
| 7,774,969 B1 * | 8/2010 | Silverman | G09F 3/207 40/586 |
| 10,117,505 B1 * | 11/2018 | Alvarez | A44C 9/0061 |
| 10,256,861 B2 * | 4/2019 | Burns | A45C 15/06 |
| 10,348,354 B1 * | 7/2019 | Balourdet | G06F 1/1688 |
| 11,108,421 B1 * | 8/2021 | Breault, Jr. | H04B 1/385 |
| 11,388,967 B1 * | 7/2022 | Riley | A45C 11/00 |
| 11,712,103 B2 * | 8/2023 | Altschul | A45C 11/182 224/607 |
| 2002/0153400 A1 * | 10/2002 | Chase | A45F 5/00 224/257 |
| 2007/0277352 A1 * | 12/2007 | Maron | A45C 13/30 24/298 |
| 2009/0120980 A1 | 5/2009 | Calayo | |
| 2011/0089208 A1 * | 4/2011 | Auman | A45C 11/00 224/191 |

(Continued)

FOREIGN PATENT DOCUMENTS

| | | | |
|---|---|---|---|
| CN | 101626960 | 1/2010 | |
| DE | 10007161 A1 * | 8/2000 | A44B 11/266 |

OTHER PUBLICATIONS

Translation of DE-10007161-A1 (Year: 2000).*

*Primary Examiner* — Adam J Waggenspack

(57) ABSTRACT

A phone case assembly enabling selective attachment, holding, and positioning of a phone and its case includes a shell, a sidewall of which is resiliently deformable. The shell has a front, which is open to allow for insertion of a phone to couple the phone to the shell. Each utility cutout of a plurality of utility cutouts, which is positioned in the shell, aligns with an associated operating element of the phone. A security ring is attached to and is selectively extensible from the shell. A strap is attached to and extends from the security ring. Each fastening element of a plurality of fastening elements is selectively attachable to the strap distal from the security ring and has a respective fastening function so that the plurality of fastening elements comprises fastening elements having a variety of fastening functions. Each fastening element can be fastened to a respective substrate.

17 Claims, 9 Drawing Sheets

(56) References Cited

U.S. PATENT DOCUMENTS

| | | | |
|---|---|---|---|
| 2015/0157116 A1* | 6/2015 | Williams | A45F 5/004 |
| | | | 224/269 |
| 2017/0155418 A1* | 6/2017 | Kim | F16M 11/041 |
| 2023/0300231 A1* | 9/2023 | Gause | B25F 1/00 |
| | | | 455/575.8 |

* cited by examiner

PHONE CASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone cases and more particularly pertains to a new phone case enabling selective attachment, holding, and positioning of a phone and its case. The present invention discloses a phone case for a phone that allows a user to fasten the phone, via its attached phone case, in various ways and to a variety of substrates, using a plurality of fastening elements.

(2) Description of Related Art Including Information Disclosed Under 37 CFR 1.97 and 1.98

The prior art relates to phone cases, which may comprise phone cases having retractable tethers and clips, and phone cases having hingable sections that function as stands. What is lacking in the prior art is a phone case comprising a strap to which a security ring is attached. Each fastening element of a plurality of fastening elements is selectively attachable to the strap distal, with each fastening element being selectively attachable to a respective substrate.

BRIEF SUMMARY OF THE INVENTION

An embodiment of the disclosure meets the needs presented above by generally comprising a shell, which defines an interior space. A sidewall of the shell is resiliently deformable. The shell has a front, which is open so that the shell is configured for insertion of a phone to couple the phone to the shell. Each utility cutout of a plurality of utility cutouts, which is positioned in the shell, aligns with an associated operating element of the phone, such as a power button, a volume button, a camera lens, and the like. A security ring is attached to and is selectively extensible from the shell. A strap is attached to and extends from the security ring. Each fastening element of a plurality of fastening elements is selectively attachable to the strap distal from the security ring and has a respective fastening function so that the plurality of fastening elements comprises fastening elements having a variety of fastening functions. Each fastening element is configured to fasten to a respective substrate, such as a belt, a beltloop, a key, a key ring, or the like, or is positioned to fasten the strap loopedly to the shell.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
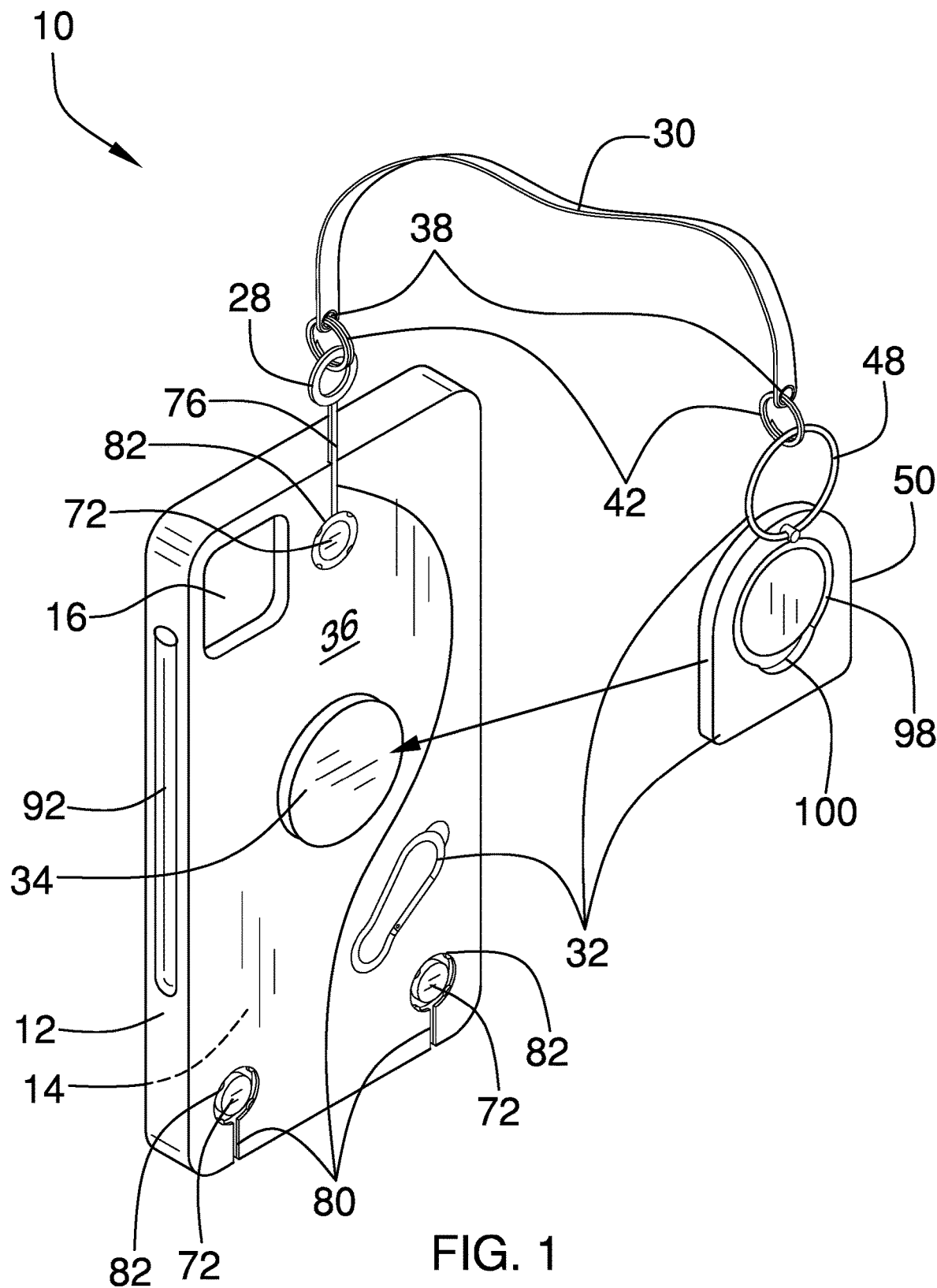
FIG. 1 is an isometric perspective view of a phone case assembly according to an embodiment of the disclosure.

With reference now to the drawings, and in particular to FIGS. 1 through 9 thereof, a new phone case embodying the principles and concepts of an embodiment of the disclosure and generally designated by the reference numeral 10 will be described.

As best illustrated in FIGS. 1 through 9, the phone case assembly 10 generally comprises a shell 12, which defines an interior space 14. A sidewall 96 of the shell 12 comprises silicone, rubber, or elastomer so that it is resiliently deformable. A plurality of voids 16, which is positioned in a rear wall 18 of the shell 12, functions to increase buoyancy of the shell 12. The shell 12 has a front 20, which is open so that the shell 12 is configured for insertion of a phone 22 to couple the phone 22 to the shell 12. Each utility cutout 24 of a plurality of utility cutouts 24, which is positioned in the shell 12, aligns with an associated operating element 26 of the phone 22, such as a power button, a volume button, a camera lens, and the like.

A security ring 28 is attached to and is selectively extensible from the shell 12. A strap 30 is attached to and extends from the security ring 28. Each fastening element 32 of a plurality of fastening elements 32 is selectively attachable to the strap 30 distal from the security ring 28 and has a respective fastening function so that the plurality of fastening elements 32 comprises fastening elements 32 having a variety of fastening functions. Each fastening element 32 is configured to fasten to a respective substrate, such as a belt, a beltloop, a key, a key ring, or the like, or is positioned to fasten the strap 30 loopedly to the shell 12. A holding magnet 34 is attached to a rear face 36 of the shell 12 and is configured to magnetically attach the shell 12 to a paramagnetic item, such as a metal post, a refrigerator, or the like.

Each grommet 38 of a pair of grommets 38 is positioned in the strap 30 proximate to a respective opposed end 40 of the strap 30. Each split ring 42 of a pair of split rings 42 is selectively positionable through a respective grommet 38. One of the split rings 42 is positioned for selective attachment to the security ring 28 and the other of the split rings 42 is positioned for selective attachment to a respective fastening element 32, to a key, or to a key ring, to removably attach the respective fastening element 32, the key, or the key ring to the strap 30, respectively. The strap 30 may comprise elastomer so that the strap 30 is resiliently stretchable.

Figure 8:
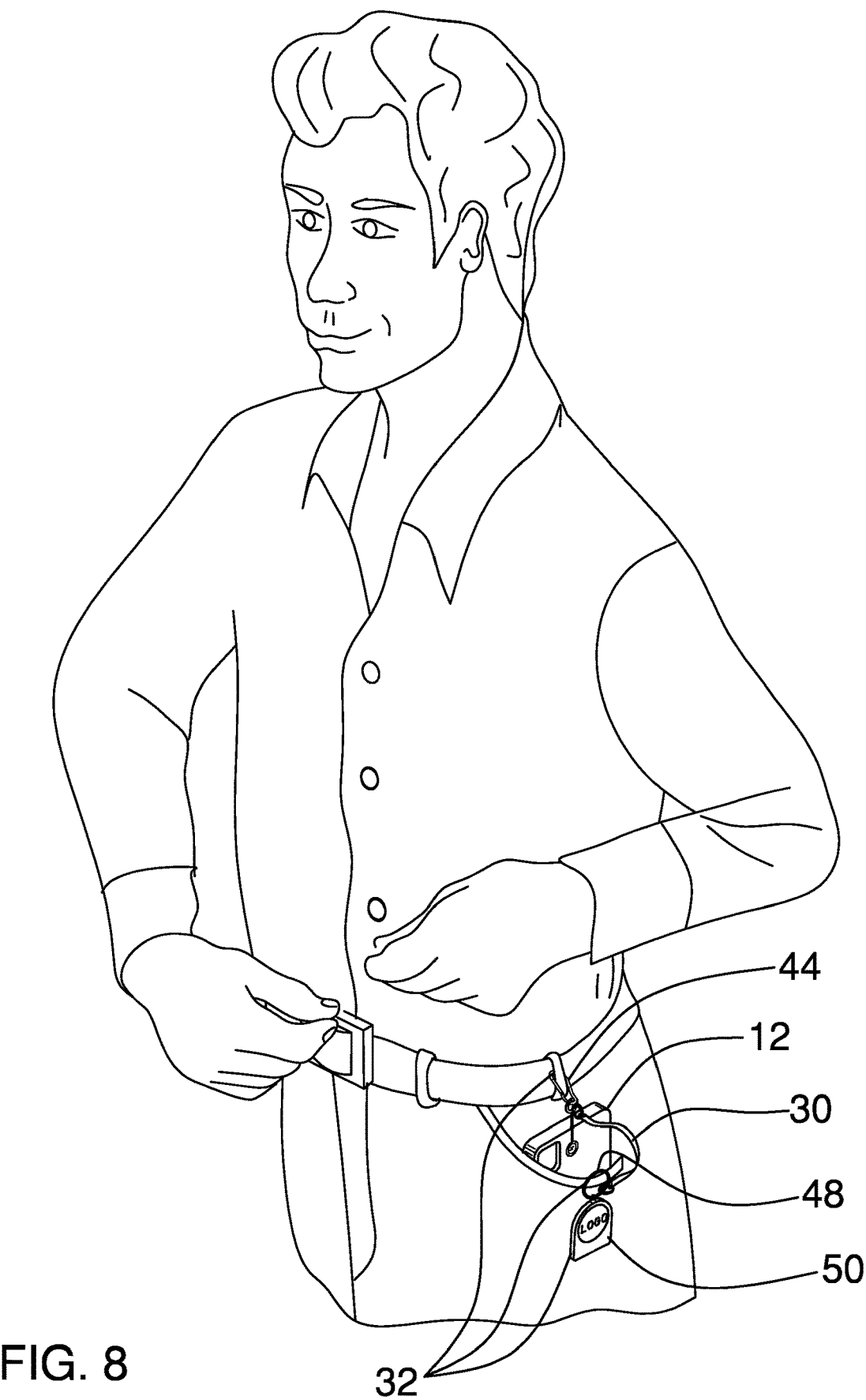
FIG. 8 is an in-use view of an embodiment of the disclosure.

The plurality of fastening elements 32 comprises a carabiner 44, which is selectively attachable to a respective split ring 42 distal from the security ring 28. The carabiner 44 is configured to selectively attach the shell 12 to the substrate. The carabiner 44 also is selectively attachable to the security ring 28. The carabiner 44 thus is configured for attachment to an article attached to a user to attach the shell 12 to the user. For example, with the shell 12 being positioned in a pocket of pants worn by a user, as shown in FIG. 8, the carabiner 44 can be attached to a belt, a beltloop, or the like, to deter pickpocketing. When not in use, the carabiner 44 is selectively insertable into a stowage cutout 46, which extends into the rear face 36 of the shell 12 and which is shaped complementarily to the carabiner 44.

Figure 7:
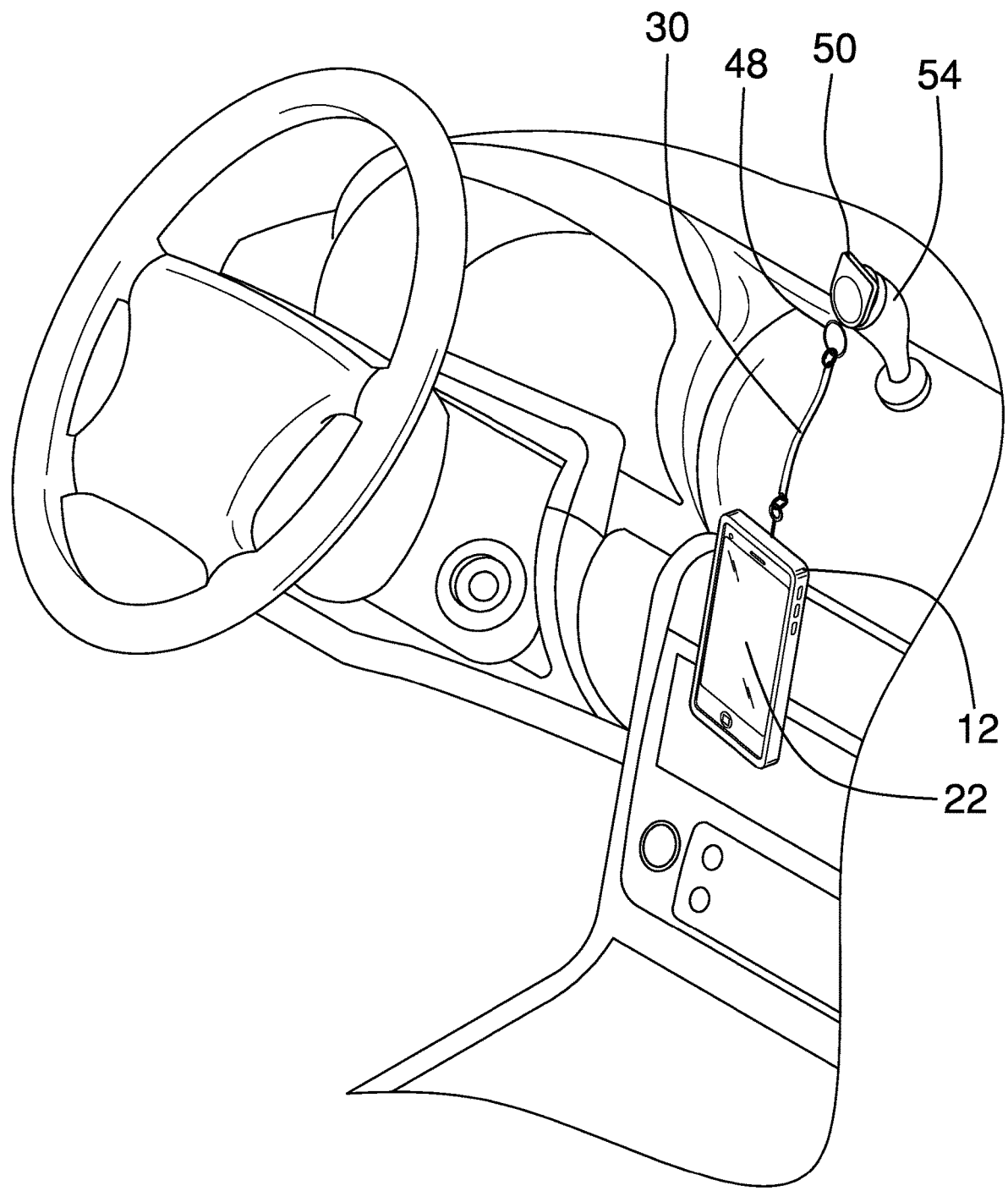
FIG. 7 is an in-use view of an embodiment of the disclosure.
Figure 9:
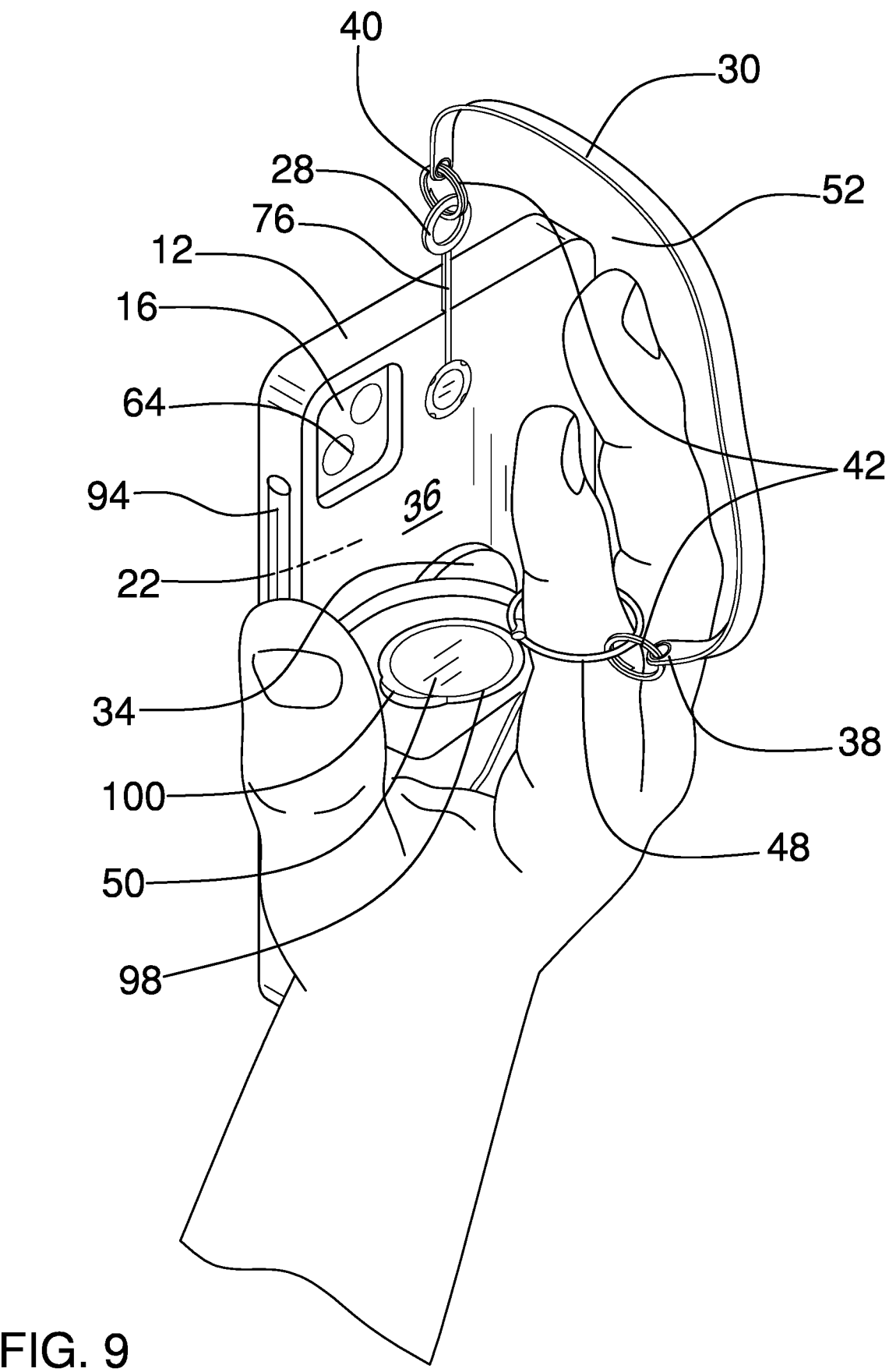
FIG. 9 is an in-use view of an embodiment of the disclosure.

The plurality of fastening elements 32 also comprises an index ring 48, which is selectively attachable to a respective split ring 42 distal from the security ring 28. The index ring 48 is configured for insertion of a finger of a user to tether the shell 12 to the user, as shown in FIG. 9. The plurality of fastening elements 32 also comprises a metal plate 50, which is attached to the index ring 48 and is positioned to engage the holding magnet 34 selectively and magnetically. The strap 30 thus defines a loop 52 into which the hand of the user is insertable, with the finger of the user being positioned through the index ring 48. As shown in FIG. 7, the metal plate 50 also is configured to engage a dash mounted magnet 54, selectively and magnetically, in a vehicle to tether the shell 12 to the dash.

As shown in FIG. 1, the index ring 48 is pivotally attached to the metal plate 50 and is insertable into a circular channel 98 positioned in the metal plate 50. The circular channel 98 is rubber coated so that the index ring 48 is frictionally attached to the metal plate 50 when not in use. A nail cutout 100, which extends from the circular channel 98, is configured for insertion of a fingernail of a user, allowing the user to selectively remove the index ring 48 from the circular channel 98.

The phone case assembly 10 comprises a lanyard 56, which is selectively attachable to the security ring 28. The lanyard 56 is configured to be positioned over a head of the user so that the shell 12 hangs from a neck of the user. A cord lock 58 is positioned on the lanyard 56 so that the lanyard 56 is selectively sizable to the neck of the user. The present invention also anticipates the security ring 28 comprising pinch opening rings, trigger snap hooks, scissor snap hooks, lobster clasps, or the like, which would facilitate removable attachment of the fastening elements 32 to the security ring 28.

The phone case assembly 10 also comprises a cover plate 60, which is shaped complementarily to the rear face 36 of the shell 12 and is selectively attachable to the shell 12. A positioning cutout 62, which is positioned in the cover plate 60 and which is shaped complementarily to the holding magnet 34, allows for insertion of the holding magnet 34 as the cover plate 60 is positioned over the rear face 36. The cover plate 60 is positioned to protect a camera lens 64 of the phone 22. The present invention also anticipates the cover plate 60 comprising a housing (not shown), which has watertight compartments for storage of peripherals, such as, but not limited to, extra batteries for the phone 22, cords, earbuds, and the like. The watertight compartments also would increase buoyancy of the phone case assembly 10.

Figure 4:
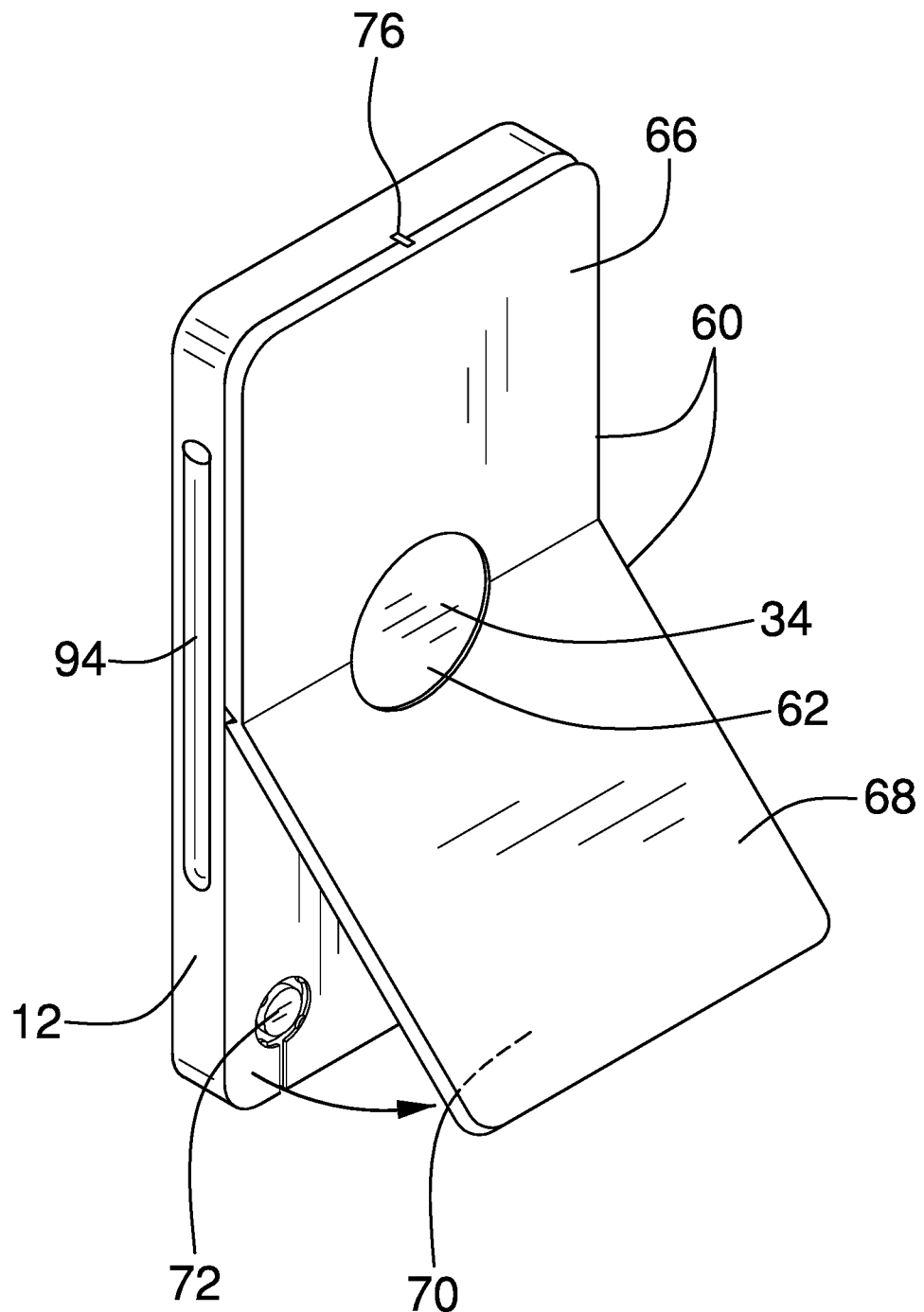
FIG. 4 is an isometric perspective view of an embodiment of the disclosure.
Figure 5:
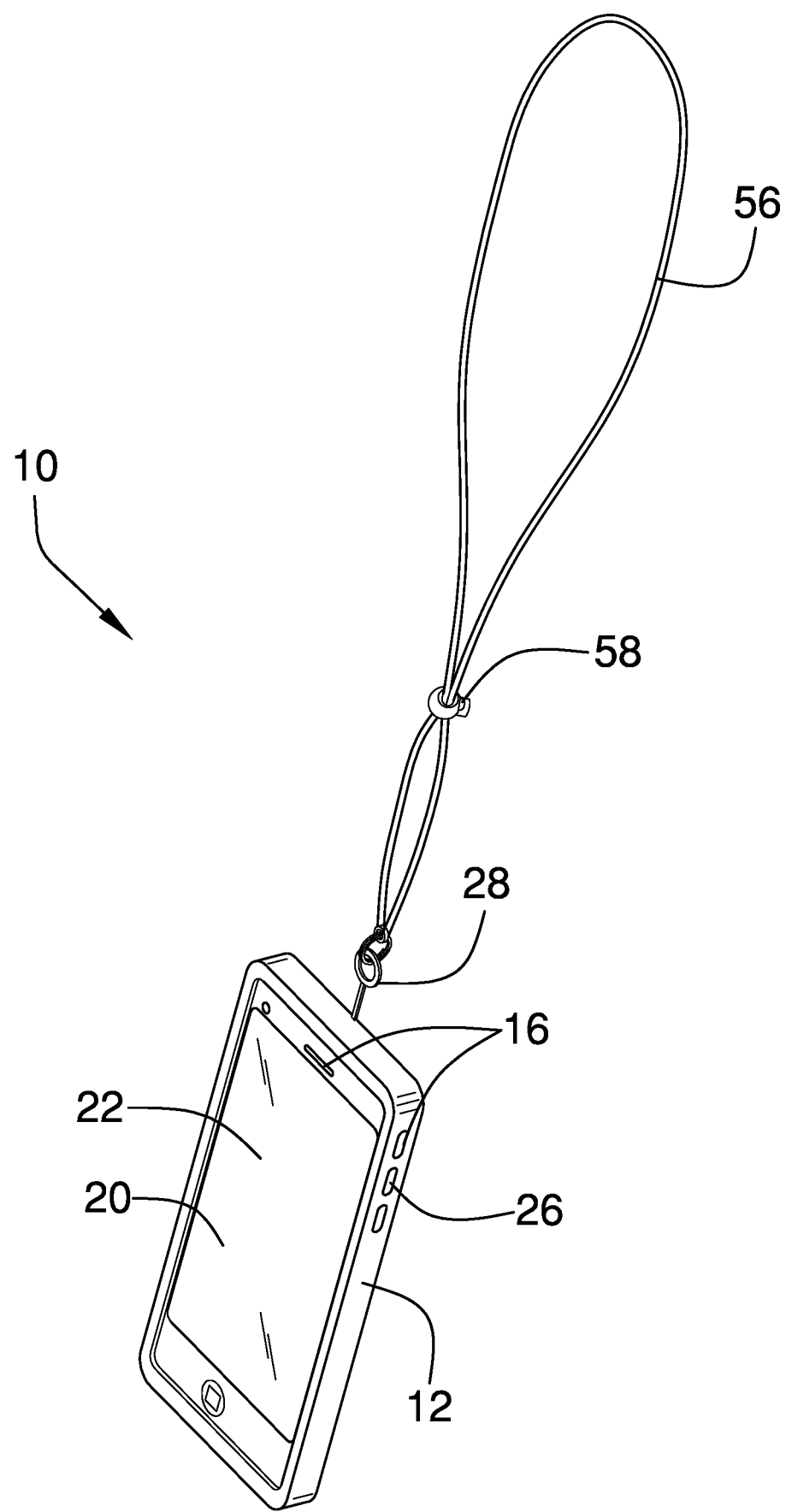
FIG. 5 is an isometric perspective view of an embodiment of the disclosure.
Figure 6:
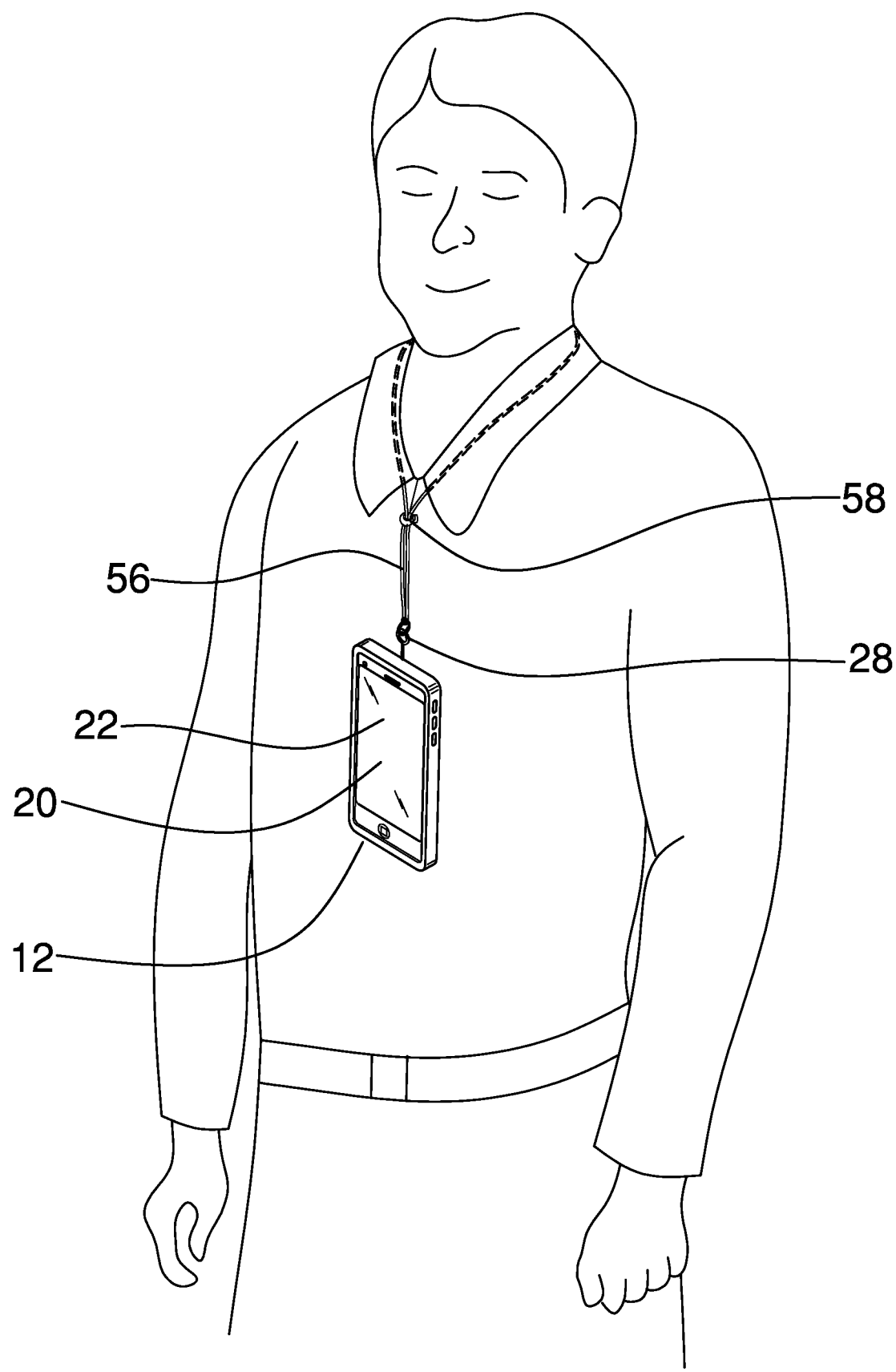
FIG. 6 is an in-use view of an embodiment of the disclosure.

As shown in FIG. 4, the cover plate 60 comprises a top section 66 that is hingedly attached to a bottom section 68. The bottom section 68 is selectively hingable to a position wherein the bottom section 68 extends angularly from the shell 12. Thus configured, the bottom section 68 supports the shell 12 on a surface, allowing for hands free viewing of the phone 22.

A plurality of attachment magnets 70 is attached to the cover plate 60 and a plurality of metal discs 72 is attached to the shell 12. The metal discs 72 are paramagnetic and thus are positioned to engage the attachment magnets 70, selectively and magnetically, to removably attach the cover plate 60 to the shell 12.

Figure 2:
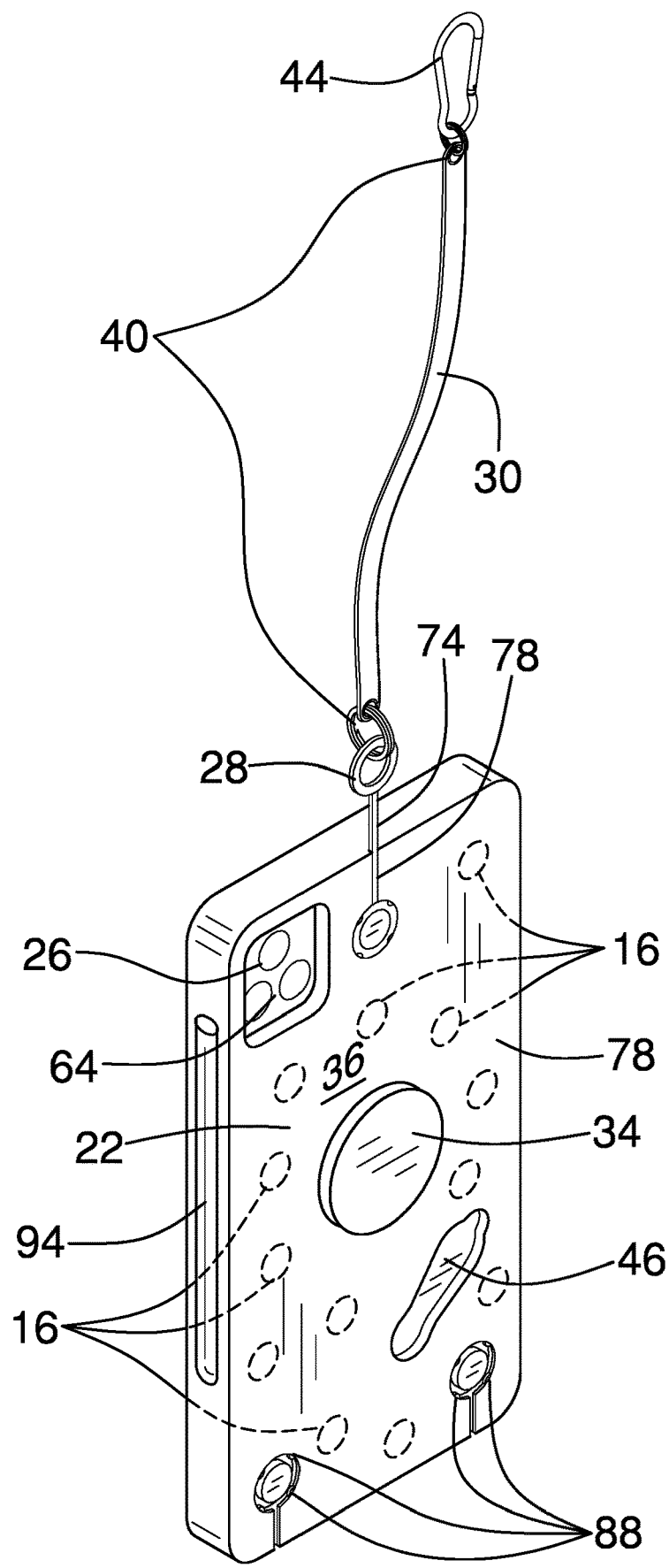
FIG. 2 is an isometric perspective view of an embodiment of the disclosure.
Figure 3:
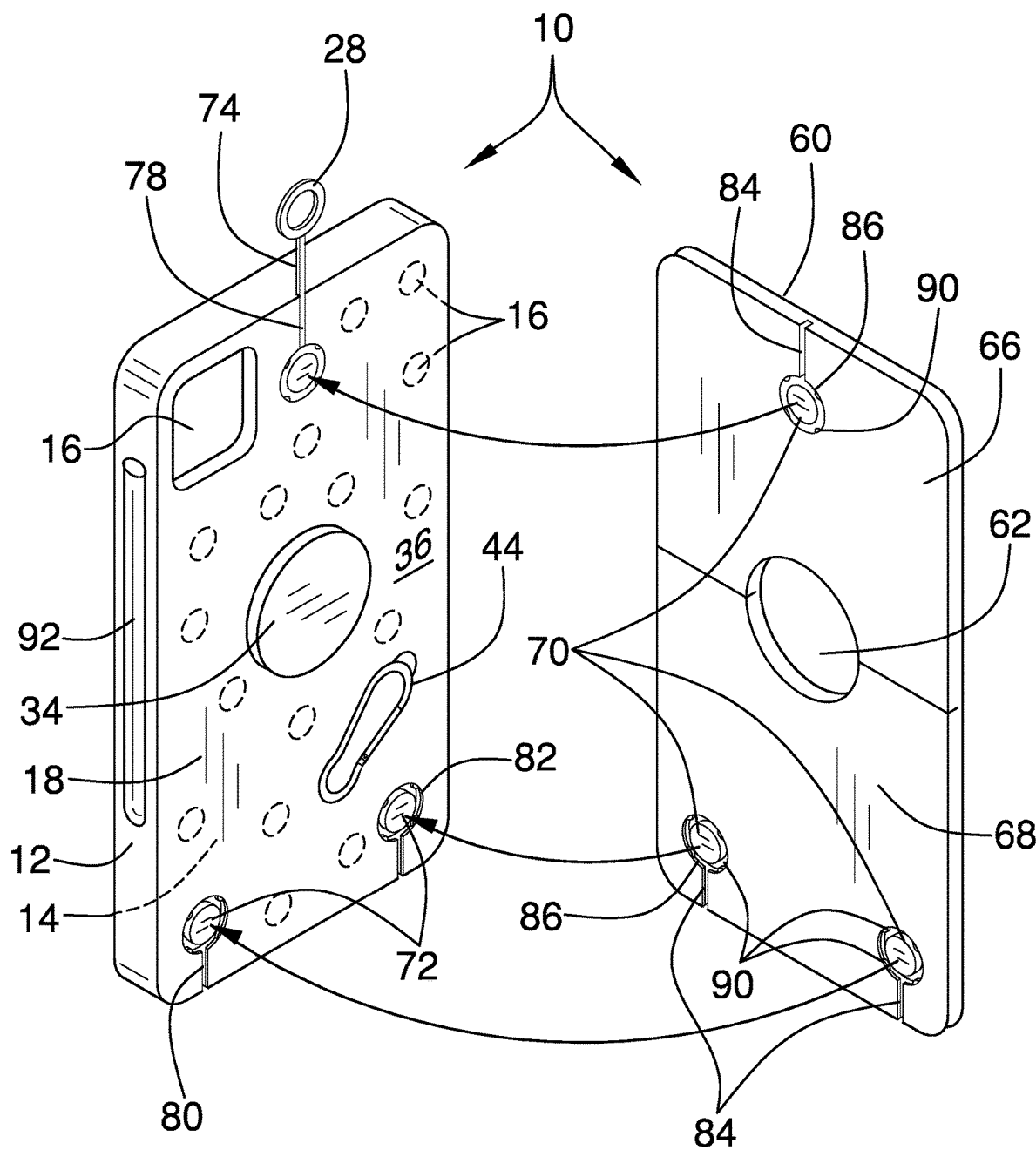
FIG. 3 is an isometric perspective view of an embodiment of the disclosure.

A first section 74 of a bar 76 is attached to and extends from the security ring 28. A second section 78 of the bar 76 is hingedly attached to the first section 74 distal from the security ring 28. A set of first slots 80 is positioned in the rear face 36 of the shell 12, with each first slot 80 being complementary to the second section 78 of the bar 76. The second section 78 is selectively insertable into a respective first slot 80 to removably engage the bar 76 to the shell 12. As shown in FIG. 2, three first slots 80 are positioned in the shell 12, thereby allowing the security ring 28 to be attached at various positions. A set of first circular cutouts 82 is positioned in the rear face 36 of the shell 12, with each first circular cutout 82 extending from a respective first slot 80. The first circular cutout 82 is positioned for at least partial insertion of the security ring 28 upon hinging of the first section 74 relative to the second section 78 of the bar 76.

A set of second slots 84 is positioned in the cover plate 60, with each the second slot 84 being complementary to the first section 74 of the bar 76. The first section 74 of the bar 76, upon hinging into abutment with the second section 78 of the bar 76, is selectively insertable into a respective second slot 84 concurrent with attachment of the cover plate 60 to the shell 12. A set of second circular cutouts 86 is positioned in the cover plate 60, with each second circular cutout 86 extending from a respective second slot 84. The second circular cutout 86 is positioned for at least partial insertion of the security ring 28 concurrent with attachment of the cover plate 60 to the shell 12.

A plurality of first nubs 88 is attached to the shell 12, with each first nub 88 extending into a respective first circular cutout 82. A plurality of second nubs 90 is attached to the cover plate 60, with each second nub 90 extending into a respective second circular cutout 86. The first nubs 88 and the second nubs 90 are positioned to frictionally engage the security ring 28 to retain the security ring 28 in the respective first circular cutout 82 and the respective second circular cutout 86, respectively.

Each metal disc 72 is shaped complementarily to the security ring 28 and is positioned in a respective first circular cutout 82. Each attachment magnet 70 is shaped complementarily to the security ring 28 and is positioned in a respective second circular cutout 86. Thus, the metal disc 72 and the attachment magnet 70 are positioned for at least partial insertion into the security ring 28.

The phone case assembly 10 also may include a stylus holder 92, which is attached to the shell 12 and which is configured to selectively attach to a stylus to removably engage the stylus to the shell 12. Such holders are known to those skilled in the art of stylus retainers, and may comprise a sleeve 94, as shown in FIG. 1, clips, magnets, and the like.

In one example of use, a phone 22 is positioned in the shell 12 and the security ring 28 is extended from the shell 12. The strap 30 is attached to the security ring 28 with one of the split rings 42, and the other split ring 42 is attached to the index ring 48. The cover plate 60 then is magnetically engaged to the shell 12 and can be used to support the shell 12 and the phone 22 on a surface for viewing the phone 22 hands free. When driving, the metal plate 50 can be attached to a dash mounted magnet 54 to tether the shell 12 and the phone 22 to the dash. With the carabiner 44 attached to the security ring 28, the user can position the shell 12 and the phone 22 in a pocket and clip the carabiner 44 to a belt or beltloop to prevent pickpocketing of the phone 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone case assembly comprising:
   a shell defining an interior space, a sidewall the shell being resiliently deformable, the shell having a front, the front being open wherein the shell is configured for insertion of a phone for coupling the phone to the shell;
   a plurality of utility cutouts positioned in the shell, such that each utility cutout aligns with an associated operating element of the phone;
   a security ring attached to and selectively extensible from the shell;
   a strap attached to and extending from the security ring;
   a plurality of fastening elements, each fastening element being selectively attachable to the strap distal from the security ring and having a respective fastening function, such that the plurality of fastening elements comprises fastening elements having a variety of fastening functions, wherein each fastening element is configured for fastening to a respective substrate or to the shell;
   a holding magnet attached to a rear face of the shell, wherein the holding magnet is configured for magnetically attaching the shell to a paramagnetic item;
   a cover plate shaped complementarily to the rear face of the shell, the cover plate being selectively attachable to the shell; and
   a positioning cutout positioned in the cover plate, the positioning cutout being shaped complementarily to the holding magnet, such that the holding magnet is inserted into the positioning cutout as the cover plate is positioned over the rear face, such that the cover plate is positioned for protecting a camera lens of the phone.

2. The phone case assembly of claim 1, wherein the shell comprises silicone, rubber, or elastomer.

3. The phone case assembly of claim 1, further including a plurality of voids positioned in a rear wall of the shell, wherein the voids are configured for increasing buoyancy of the shell.

4. The phone case assembly of claim 1, further including:
   a pair of grommets positioned in the strap, each grommet being positioned proximate to a respective opposed end of the strap; and
   a pair of split rings, each split ring being selectively positionable through a respective grommet, such that one of the split rings is positioned for selective attachment to the security ring and such that the other of the split rings is positioned for selective attachment to a respective fastening element, to a key, or to a key ring for removably attaching the respective fastening element, the key, or the key ring to the strap, respectively.

5. The phone case assembly of claim 1, wherein the plurality of fastening elements comprises a carabiner selectively attachable to a respective split ring distal from the security ring, wherein the carabiner is configured for selectively attaching the shell to the substrate, the carabiner being selectively attachable to the security ring, wherein the carabiner is configured for attachment to an article attached to a user for attaching the shell to the user.

6. The phone case assembly of claim 5, further including a stowage cutout extending into a rear face of the shell, the stowage cutout being shaped complementarily to the carabiner, such that the carabiner is selectively insertable into the stowage cutout for stowing the carabiner when not in use.

7. The phone case assembly of claim 1, wherein the plurality of fastening elements comprises an index ring selectively attachable to a respective split ring distal from the security ring, wherein the index ring is configured for insertion of a finger of a user for tethering the shell to the user.

8. The phone case assembly of claim 7, wherein the plurality of fastening elements comprises a metal plate attached to the index ring, such that the metal plate is positioned for selectively magnetically engaging the holding magnet, wherein the strap defines a loop into which the hand of the user is insertable, with the finger of the user positioned through the index ring, wherein the metal plate is configured for selectively magnetically engaging a dash mounted magnet in a vehicle for tethering the shell to the dash.

9. The phone case assembly of claim 1, further including a lanyard selectively attachable to the security ring, wherein the lanyard is configured for positioning over a head of the user, such that the shell hangs from a neck of the user.

10. The phone case assembly of claim 9, further including a cord lock positioned on the lanyard, such that the lanyard is selectively sizable to the neck of the user.

11. The phone case assembly of claim 1, wherein the cover plate comprises a top section hingedly attached to a bottom section, such that the bottom section is selectively hingable to a position wherein the bottom section extends angularly from the shell, wherein the bottom section is configured for supporting the shell.

12. The phone case assembly of claim 1, further including:
a plurality of attachment magnets attached to the cover plate; and
a plurality of metal discs attached to the shell, the metal discs being paramagnetic, such that the metal discs are positioned for selectively magnetically engaging the attachment magnets for removably attaching the cover plate to the shell.

13. The phone case assembly of claim 12, further including:
a bar comprising:
a first section attached to and extending from the security ring, and
a second section hingedly attached to the first section distal from the security ring;
a set of first slots positioned in the rear face of the shell, each first slot being complementary to the second section of the bar, such that the second section is selectively insertable into a respective first slot for removably engaging the bar to the shell;
a set of first circular cutouts positioned in the rear face of the shell, each first circular cutout extending from a respective first slot, such that the first circular cutout is positioned for at least partial insertion of the security ring upon hinging of the first section relative to the second section;
a set of second slots positioned in the cover plate, each second slot being complementary to first section of the bar, such that the first section of the bar, upon hinging into abutment with the second section of the bar, is selectively insertable into a respective second slot concurrent with attachment of the cover plate to the shell; and
a set of second circular cutouts positioned in the cover plate, each second circular cutout extending from a respective second slot, such that the second circular cutout is positioned for at least partial insertion of the security ring concurrent with attachment of the cover plate to the shell.

14. The phone case assembly of claim 13, further including:
a plurality of first nubs attached to the shell, each first nub extending into a respective first circular cutout, such that the first nub is positioned for frictionally engaging the security ring for retaining the security ring in the respective first circular cutout; and
a plurality of second nubs attached to the cover plate, each second nub extending into a respective second circular cutout, such that the second nub is positioned for frictionally engaging the security ring for retaining the security ring in the respective second circular cutout.

15. The phone case assembly of claim 13, wherein:
each metal disc being shaped complementarily to the security ring and being positioned in a respective first circular cutout, such that the metal disc is positioned for at least partial insertion into the security ring; and
each attachment magnet being shaped complementarily to the security ring and being positioned in a respective second circular cutout, such that the attachment magnet is positioned for at least partial insertion into the security ring.

16. The phone case assembly of claim 1, further including a stylus holder attached to the shell, wherein the stylus holder is configured for selectively attaching to a stylus for removably engaging the stylus to the shell.

17. A phone case assembly comprising:
a shell defining an interior space, a sidewall of the shell being resiliently deformable, the shell having a front, the front being open wherein the shell is configured for insertion of a phone for coupling the phone to the shell, the shell comprising silicone, rubber, or elastomer;
a plurality of utility cutouts positioned in the shell, such that each utility cutout aligns with an associated operating element of the phone;
a plurality of voids positioned in a rear wall of the shell, wherein the voids are configured for increasing buoyancy of the shell;
a security ring attached to and selectively extensible from the shell;
a bar comprising:
a first section attached to and extending from the security ring, and
a second section hingedly attached to the first section distal from the security ring;
a set of first slots positioned in the rear face of the shell, each first slot being complementary to the second section of the bar, such that the second section is selectively insertable into a respective first slot for removably engaging the bar to the shell;
a set of first circular cutouts positioned in the rear face of the shell, each first circular cutout extending from a respective first slot, such that the first circular cutout is positioned for at least partial insertion of the security ring upon hinging of the first section relative to the second section;
a plurality of first nubs attached to the shell, each first nub extending into a respective first circular cutout, such that the first nub is positioned for frictionally engaging the security ring for retaining the security ring in the respective first circular cutout;
a strap attached to and extending from the security ring;
a plurality of fastening elements, each fastening element being selectively attachable to the strap distal from the security ring and having a respective fastening function, such that the plurality of fastening elements comprises fastening elements having a variety of fastening functions, wherein each fastening element is configured for fastening to a respective substrate or to the shell;
a pair of grommets positioned in the strap, each grommet being positioned proximate to a respective opposed end of the strap;
a pair of split rings, each split ring being selectively positionable through a respective grommet, such that one of the split rings is positioned for selective attachment to the security ring and such that the other of the split rings is positioned for selective attachment to a respective fastening element, to a key, or to a key ring for removably attaching the respective fastening element, the key, or the key ring to the strap, respectively;
a holding magnet attached to a rear face of the shell, wherein the holding magnet is configured for magnetically attaching the shell to a paramagnetic item;
the plurality of fastening elements comprising:
  a carabiner selectively attachable to a respective split ring distal from the security ring, wherein the carabiner is configured for selectively attaching the shell to the substrate, the carabiner being selectively attachable to the security ring, wherein the carabiner is configured for attachment to an article attached to a user for attaching the shell to the user,
  an index ring selectively attachable to a respective split ring distal from the security ring, wherein the index ring is configured for insertion of a finger of a user for tethering the shell to the user, and
  a metal plate attached to the index ring, such that the metal plate is positioned for selectively magnetically engaging the holding magnet, wherein the strap defines a loop into which the hand of the user is insertable, with the finger of the user positioned through the index ring, wherein the metal plate is configured for selectively magnetically engaging a dash mounted magnet in a vehicle for tethering the shell to the dash;
a stowage cutout extending into the rear face of the shell, the stowage cutout being shaped complementarily to the carabiner, such that the carabiner is selectively insertable into the stowage cutout for stowing the carabiner when not in use;
a lanyard selectively attachable to the security ring, wherein the lanyard is configured for positioning over a head of the user, such that the shell hangs from a neck of the user;
a cord lock positioned on the lanyard, such that the lanyard is selectively sizable to the neck of the user;
a cover plate shaped complementarily to the rear face of the shell, the cover plate being selectively attachable to the shell, the cover plate comprising a top section hingedly attached to a bottom section, such that the bottom section is selectively hingable to a position wherein the bottom section extends angularly from the shell, wherein the bottom section is configured for supporting the shell;
a positioning cutout positioned in the cover plate, the positioning cutout being shaped complementarily to the holding magnet, such that the holding magnet is inserted into the positioning cutout as the cover plate is positioned over the rear face, such that the cover plate is positioned for protecting a camera lens of the phone;
a plurality of attachment magnets attached to the cover plate;
a plurality of metal discs attached to the shell, the metal discs being paramagnetic, such that the metal discs are positioned for selectively magnetically engaging the attachment magnets for removably attaching the cover plate to the shell, each metal disc being shaped complementarily to the security ring and being positioned in a respective first circular cutout, such that the metal disc is positioned for at least partial insertion into the security ring;
a set of second slots positioned in the cover plate, each second slot being complementary to first section of the bar, such that the first section of the bar, upon hinging into abutment with the second section of the bar, is selectively insertable into a respective second slot concurrent with attachment of the cover plate to the shell;
a set of second circular cutouts positioned in the cover plate, each second circular cutout extending from a respective second slot, such that the second circular cutout is positioned for at least partial insertion of the security ring concurrent with attachment of the cover plate to the shell, each attachment magnet being shaped complementarily to the security ring and being positioned in a respective second circular cutout, such that the attachment magnet is positioned for at least partial insertion into the security ring;
a plurality of second nubs attached to the cover plate, each second nub extending into a respective second circular cutout, such that the second nub is positioned for frictionally engaging the security ring for retaining the security ring in the respective second circular cutout; and
a stylus holder attached to the shell, wherein the stylus holder is configured for selectively attaching to a stylus for removably engaging the stylus to the shell.

* * * * *